(12) United States Patent
Chung et al.

(10) Patent No.: US 12,735,322 B2
(45) Date of Patent: Sep. 15, 2026

(54) METAMATERIAL STRUCTURE AND FORMING METHOD THEREOF

(71) Applicant: SEOUL NATIONAL UNIVERSITY R&DB FOUNDATION, Seoul (KR)

(72) Inventors: In Chung, Seoul (KR); Hyungseok Lee, Seoul (KR); Myeongjeong Lee, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 628 days.

(21) Appl. No.: 18/313,234

(22) Filed: May 5, 2023

(65) Prior Publication Data

US 2023/0357023 A1 Nov. 9, 2023

(30) Foreign Application Priority Data

May 6, 2022 (KR) ........................ 10-2022-0056105

(51) Int. Cl.

| | |
|---|---|
| ***C01B 32/225*** | (2017.01) |
| ***C01B 21/064*** | (2006.01) |
| *B82Y 40/00* | (2011.01) |

(52) U.S. Cl.

CPC ........ *C01B 32/225* (2017.08); *C01B 21/0648* (2013.01); *B82Y 40/00* (2013.01)

(58) Field of Classification Search

None

See application file for complete search history.

(56) References Cited

U.S. PATENT DOCUMENTS

| | | | |
|---|---|---|---|
| 2020/0036099 | A1 | 1/2020 | Wongkasem et al. |
| 2021/0048558 | A1 | 2/2021 | Falk et al. |

(Continued)

FOREIGN PATENT DOCUMENTS

| | | | |
|---|---|---|---|
| CN | 112563863 | A | 3/2021 |
| JP | 6637895 | B2 | 1/2020 |

(Continued)

OTHER PUBLICATIONS

Myeongjeong Lee et al., "r-BN: A fine hyperbolic dispersion modulator for bulk metamaterials consisting of heterostructured nanohybrids of h-BN and graphene," Journal of Solid State Chemistry, 2022, vol. 309, No. 122937.

*Primary Examiner* — Guinever S Gregorio

(57) ABSTRACT

A metamaterial structure and a forming method thereof are provided. The metamaterial structure according to embodiments of the present invention comprises first metamaterial unit structures and second metamaterial unit structures, and the first metamaterial unit structures and the second metamaterial unit structures are arranged alternately. The method of forming a metamaterial structure according to embodiments of the present invention comprises forming a first suspension including first metamaterial unit structures formed by exfoliation of a first metamaterial by mixing the first metamaterial and a first solvent, forming a second suspension including second metamaterial unit structures formed by exfoliation of a second metamaterial by mixing the second metamaterial and a second solvent, forming a nanohybrid structure in which the first metamaterial unit structures and the second metamaterial unit structures are arranged alternately by mixing the first suspension and the second suspension and compressing and sintering the nanohybrid structure.

5 Claims, 10 Drawing Sheets

(56) References Cited

U.S. PATENT DOCUMENTS

| | | | | |
|---|---|---|---|---|
| 2021/0184065 | A1* | 6/2021 | Banadaki | H10F 77/311 |
| 2025/0227949 | A1* | 7/2025 | Wang | C30B 29/403 |

FOREIGN PATENT DOCUMENTS

| | | | |
|---|---|---|---|
| KR | 101877376 | B1 | 7/2018 |
| KR | 1020210150792 | A | 12/2021 |
| WO | 2015/121682 | A1 | 8/2015 |
| WO | 2021/255077 | A1 | 12/2021 |

* cited by examiner

METAMATERIAL STRUCTURE AND FORMING METHOD THEREOF

BACKGROUND OF THE INVENTION

1. Field of the Invention

The present invention relates to a metamaterial structure and a forming method thereof.

2. Description of the Related Art

Metamaterials are materials that exhibit unique properties that do not exist in nature, such as negatively refracting light or creating a focus smaller than the wavelength of light. It is difficult to control the physical properties of existing metamaterials because the artificially created structure determines the metamaterial-derived properties. In addition, existing metamaterials are mainly developed as nanoscale thin films or nanowires, so technology implementation is difficult and the application of metamaterials is limited.

SUMMARY OF THE INVENTION

The present invention provides a novel metamaterial structure.

The present invention provides a method of forming the metamaterial structure.

The other objects of the present invention will be clearly understood with reference to the following detailed description and the accompanying drawings.

A metamaterial structure according to embodiments of the present invention comprises first metamaterial unit structures and second metamaterial unit structures, and the first metamaterial unit structures and the second metamaterial unit structures are arranged alternately.

The first metamaterial may comprise hexagonal boron nitride, and the second metamaterial may comprise graphite. The first metamaterial unit structures may comprise at least one of boron nitride nanoflakes and boron nitride nanosheets, and the second metamaterial unit structures may comprise at least one of exfoliated graphite nanoflakes and few-layer graphene nanosheets.

The properties of the metamaterial structure may be controlled by the thickness and mixing ratio of the first metamaterial unit structures and the second metamaterial unit structures.

The metamaterial structure may be formed by a method comprising forming a first suspension including the first metamaterial unit structures formed by exfoliation of a first metamaterial by mixing the first metamaterial and a first solvent, forming a second suspension including the second metamaterial unit structures formed by exfoliation of a second metamaterial by mixing the second metamaterial and a second solvent, forming a nanohybrid structure in which the first metamaterial unit structures and the second metamaterial unit structures are arranged alternately by mixing the first suspension and the second suspension, and compressing and sintering the nanohybrid structure.

The first metamaterial unit structures and the second metamaterial unit structures may have opposite charges to each other, and the nanohybrid structure may be formed by a spontaneous self-assembly reaction induced by the electrostatic interaction between the first metamaterial unit structures and the second metamaterial unit structures.

A method of forming a metamaterial structure according to embodiments of the present invention comprises forming a first suspension including first metamaterial unit structures formed by exfoliation of a first metamaterial by mixing the first metamaterial and a first solvent, forming a second suspension including second metamaterial unit structures formed by exfoliation of a second metamaterial by mixing the second metamaterial and a second solvent, forming a nanohybrid structure in which the first metamaterial unit structures and the second metamaterial unit structures are arranged alternately by mixing the first suspension and the second suspension and compressing and sintering the nanohybrid structure.

The first metamaterial may comprise hexagonal boron nitride, and the second metamaterial may comprise graphite. The first metamaterial unit structures may comprise at least one of boron nitride nanoflakes and boron nitride nanosheets, and the second metamaterial unit structures may comprise at least one of exfoliated graphite nanoflakes and few-layer graphene nanosheets.

The first metamaterial unit structures and the second metamaterial unit structures may have opposite charges to each other, and the nanohybrid structure may be formed by a spontaneous self-assembly reaction induced by the electrostatic interaction between the first metamaterial unit structures and the second metamaterial unit structures.

According to embodiments of the present invention, a new metamaterial structure is provided. The properties of the metamaterial structure can be controlled by a combination, a composition ratio, a thickness ratio, and the like of unit structures. The metamaterial structure can be mass-produced through a simple process. The metamaterial structure shows a hyperbolic signal with respect to light at all incident angles and can control the hyperbolic signal and permittivity according to the composition ratio change, thereby enabling negative refraction control.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1:
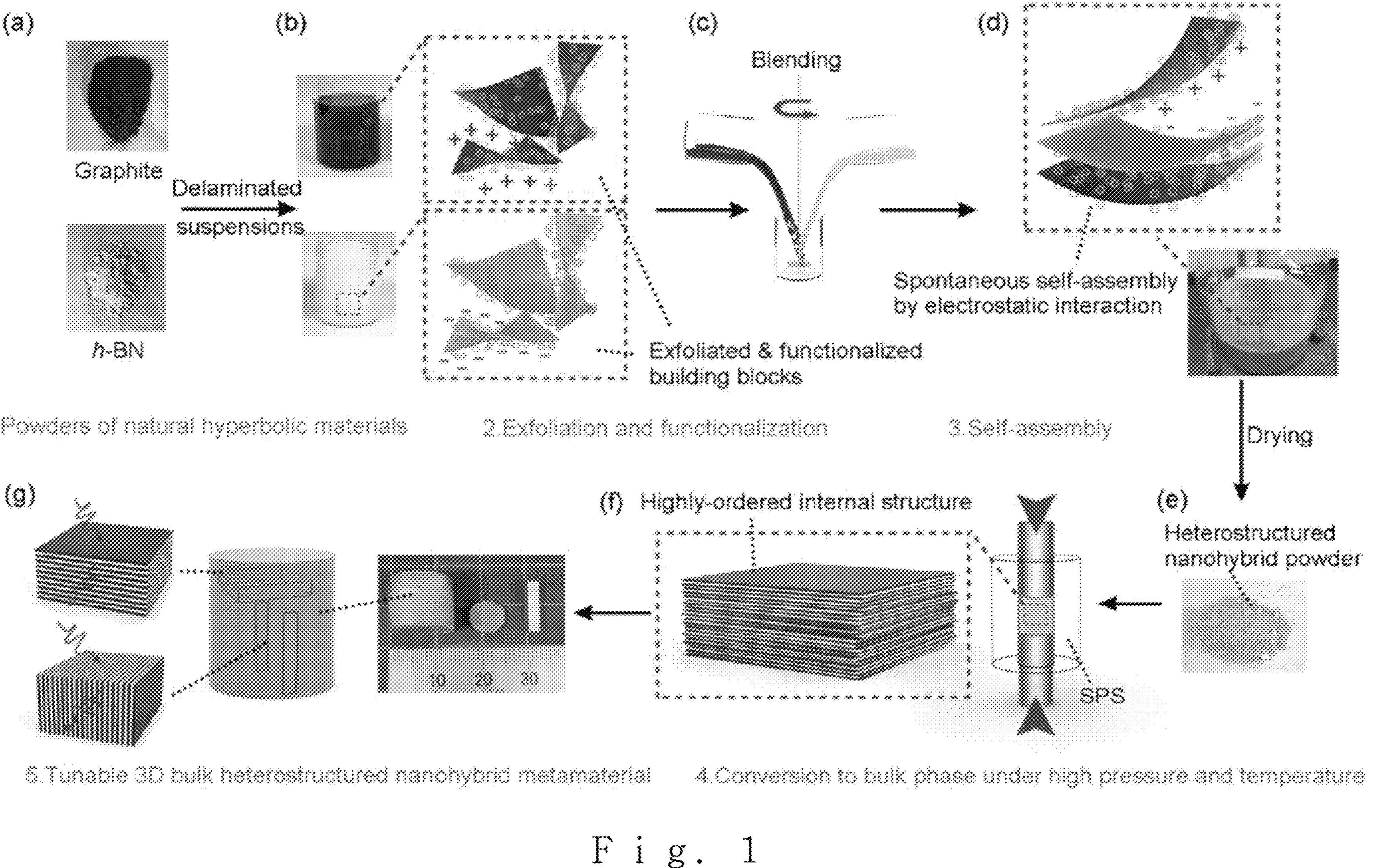
FIG. 1 shows a metamaterial structure and a method of forming the metamaterial structure according to an embodiment of the present invention.

Hereinafter, a detailed description will be given of the present invention with reference to the following embodiments. The purposes, features, and advantages of the present invention will be easily understood through the following embodiments. The present invention is not limited to such embodiments, but may be modified in other forms. The embodiments to be described below are nothing but the ones provided to bring the disclosure of the present invention to perfection and assist those skilled in the art to completely understand the present invention. Therefore, the following embodiments are not to be construed as limiting the present invention.

Terms like 'first', 'second', etc., may be used to indicate various components, but the components should not be restricted by the terms. These terms are only used to distinguish one element, component, region, layer or section from another region, layer or section. A first element, component, region, layer or section could be termed a second element, component, region, layer or section without departing from the teaching of the embodiments of the present invention. It will be understood that when an element is referred to as being "on" another element, it can be directly on the other element or intervening elements may be present therebetween.

The size of the element or the relative sizes between elements in the drawings may be shown to be exaggerated for more clear understanding of the present invention. In addition, the shape of the elements shown in the drawings may be somewhat changed by variation of the manufacturing process or the like. Accordingly, the embodiments disclosed herein are not to be limited to the shapes shown in the drawings unless otherwise stated, and it is to be understood to include a certain amount of variation.

The terminology used herein is for the purpose of describing particular embodiments only and is not intended to limit the invention. It is to be understood that the singular forms "a," "an," and "the" include plural references unless the context clearly dictates otherwise. It will be further understood that the terms "comprises" or "has," when used in this specification, specify the presence of stated features, integers, steps, operations, elements, and/or components, but do not preclude the presence or addition of one or more other features, integers, steps, operations, elements, components, and/or groups thereof.

A metamaterial structure according to embodiments of the present invention comprises first metamaterial unit structures and second metamaterial unit structures, and the first metamaterial unit structures and the second metamaterial unit structures are arranged alternately.

A method of forming a metamaterial structure according to embodiments of the present invention comprises forming a first suspension including first metamaterial unit structures formed by exfoliation of a first metamaterial by mixing the first metamaterial and a first solvent, forming a second suspension including second metamaterial unit structures formed by exfoliation of a second metamaterial by mixing the second metamaterial and a second solvent, forming a nanohybrid structure in which the first metamaterial unit structures and the second metamaterial unit structures are arranged alternately by mixing the first suspension and the second suspension and compressing and sintering the nanohybrid structure.

The first metamaterial may comprise hexagonal boron nitride, and the second metamaterial may comprise graphite. The first metamaterial unit structures may comprise at least one of boron nitride nanoflakes and boron nitride nanosheets, and the second metamaterial unit structures may comprise at least one of exfoliated graphite nanoflakes and few-layer graphene nanosheets.

The properties of the metamaterial structure may be controlled by the thickness and mixing ratio of the first metamaterial unit structures and the second metamaterial unit structures.

The first metamaterial unit structures and the second metamaterial unit structures may have opposite charges to each other, and the nanohybrid structure may be formed by a spontaneous self-assembly reaction induced by the electrostatic interaction between the first metamaterial unit structures and the second metamaterial unit structures.

[Formation Example of Boron Nitride Unit Structures]

Formation Example of Boron Nitride Nanoflakes ($BN_{NF}$)

A mixture of hexagonal boron nitride (h-BN) bulk material (24.0 g), LiCl (7.216 g) in DMF solution (1760 mL), and propylenecarbonate (PC, 240 mL) was ultrasonicated with ultrasound intensity of about 500 W/cm$^2$ for 1 h (80% amplitude, 1000 kHz) to form a suspension. The suspension was washed subsequently by a series of polar solvents of HCl, ammonia, DMF, and isopropanol to obtain a white precipitate. The precipitate was dispersed in DMF (4800 mL) with 1 wt % sodium dodecylbenzenesulfonate (SDBS) to form a $BN_{NF}$ suspension ($BN_{NF}$ unit structure suspension) including the negatively charged boron nitride nanoflakes ($BN_{NF}$) by ultrasonication for 1 h. The boron nitride nanoflakes ($BN_{NF}$) have a thickness of about 80 nm, and the concentration of the $BN_{NF}$ suspension is about 0.4 mg/mL.

Formation Example of Boron Nitride Nanosheets ($BN_{NS}$)

A mixture of hexagonal boron nitride (h-BN) bulk material (5.0 g) and DMF (200 mL) was ball-milled for 24 h with a rotational speed of 300 rpm to form boron nitride powder. The size of zirconia balls was 1.0 and 3.0 mm, and a ration of the powder to balls is 24:1. The boron nitride powder was dispersed in DMF (4800 mL) with 1 wt % sodium dodecylbenzenesulfonate (SDBS) to form a $BN_{NS}$ suspension ($BN_{NS}$ unit structure suspension) including the negatively charged boron nitride nanosheets ($BN_{NS}$) by ultrasonication for 1 h. The boron nitride nanosheets ($BN_{NS}$) have a thickness of about 16 nm, and the concentration of the $BN_{NS}$ suspension is about 0.4 mg/mL. The supernatant solutions were decanted carefully after the centrifugation at 1000 rpm to avoid possible contamination by zirconia fragments.

[Formation Example of Carbon Unit Structures]

Formation Example of Exfoliated Graphite (EG) Nanoflakes

A mixture of graphite powder (4.0 g), LiCl (6.56 g) in DMF solution (1600 mL), and PC (40 mL) was ultrasonicated for 1 h (80% amplitude, 1000 kHz) with ultrasound intensity of about 500 W/cm$^2$ to form a suspension. The suspension was washed with a series of polar solvents of HCl, NaOH, DMF, and isopropanol to obtain a black EG precipitate. The EG precipitate was dispersed in DMF (2 L) with 1 wt % polyethyleneimine (PEI) to form a EG suspension (EG unit structure suspension) including the positively charged EG nanoflakes by ultrasonication for 1 h. The EG nanoflakes have a thickness of about 18 nm, and the concentration of the EG suspension is about 1.6 mg/mL.

Formation Example of Few-Layer Graphene (FLG) Nanosheets

A mixture of FLG powder (0.41 g) and DMF (2 L) was ultrasonicated for 0.5 h (80% amplitude, 1000 kHz) with ultrasound intensity of about 500 W/cm$^2$ to obtain a FLG precipitate through the centrifugation and washing-filtering processes. The FLG precipitate was dispersed in DMF (2 L) with 1 wt % polyethyleneimine (PEI) to form a FLG suspension (FLG unit structure suspension) including the positively charged FLG nanosheets by ultrasonication for 0.5 h. The FLG nanosheets have a thickness of about 7 nm, and the concentration of the FLG suspension is about 0.3 mg/mL.

[Formation Example of EG-$BN_{NF}$ Metamaterial Structure and FLG-$BN_{NS}$ Metamaterial Structure]

The suspensions of the unit structures were centrifuged at 1000 rpm for 5 min, and the supernatant solutions were collected and used for the self-assembly reaction. The $BN_{NF}$ suspension was mixed with the EG suspension in appropriate volumetric ratios with vigorous stirring. The $BN_{NS}$ suspension was mixed with the FLG suspension in appropriate volumetric ratios with vigorous stirring. The volumetric ratio of such suspensions was delicately controlled to give the final mass ratio of boron nitride (BN) to carbon (C) from 10:1 to 80:1 in bulk samples. The BN:C mass ratios were determined by elemental analysis for final spark plasma sintered bulk samples using a TCD (Thermal conductivity detection) analyzer and non-dispersive infrared analyzer. For example, for the nominal mixing ratio of the unit structure suspensions of the $BN_{NF}$ and EG of 10:1, 20:1, 30:1, 80:1, the analyzed mass ratio was 9.14:1, 19.49:1, 33.99:1, and 82.58:1, respectively.

Because the $BN_{NF}$ unit structures have an opposite charge to the EG unit structures, their mixing promotes the spontaneous self-assembly reaction induced by electrostatic interaction to form EG-$BN_{NF}$ nanohybrid structure. Also, because the $BN_{NS}$ unit structures have an opposite charge to the FLG unit structures, their mixing promotes the spontaneous self-assembly reaction induced by electrostatic interaction to form FLG-$BN_{NS}$ nanohybrid structure.

The EG-$BN_{NF}$ nanohybrid structure was centrifuged, washed with DMF, and dried under vacuum. The EG-$BN_{NF}$ nanohybrid structure powder was loaded into a graphite mold and consolidated at 1900° C. for 10 min under an axial pressure of 50 MPa in a vacuum using spark plasma sintering to form an EG-$BN_{NF}$ metamaterial structure. That is, the EG-$BN_{NF}$ metamaterial structure is formed by compressing and sintering the EG-$BN_{NF}$ nanohybrid structure. Also, The FLG-$BN_{NS}$ nanohybrid structure was centrifuged, washed with DMF, and dried under vacuum. The FLG-$BN_{NS}$ nanohybrid structure powder was loaded into a graphite mold and consolidated at 1900° C. for 10 min under an axial pressure of 50 MPa in a vacuum using spark plasma sintering to form an EG-$BN_{NF}$ metamaterial structure. That is, the FLG-$BN_{NS}$ metamaterial structure is formed by compressing and sintering the FLG-$BN_{NS}$ nanohybrid structure.

The thickness of the respective unit structures in the metamaterial structure was calculated from the thickness of the unit structures ($BN_{NF}$, $BN_{NS}$, EG, and FLG) as shown in Table 1. The BN:C mass ratio was regarded as thickness ratios of $BN_{NF}$/$BN_{NS}$ to EG/FLG assuming that each unit structure covers the same area in the lateral dimension of the SPS-processed bulk phases. The $BN_{NF}$/$BN_{NS}$ layer thickness in the SPS-processed metamaterial structure was assumed by multiplying the BN:C mass ratio and EG/FLG thickness, which was directly measured by a TEM.

TABLE 1

| Pair of the building blocks | BN:C mass ratio in the metamaterial structures | Thickness of the building block in suspensions | | Thickness of the building block in the metamaterial structures | |
|---|---|---|---|---|---|
| | | $BN_{NF}$/$BN_{SS}$ | EG/FLG | $BN_{NF}$/$BN_{SS}$ | EG/FLG |
| $BN_{NF}$-EG | 10:1, 20:1, 30:1, 50:1, 80:1 | $BN_{NF}$, 80 nm | EG, 18 nm | 200, 400, 600, 1000, 1600 nm (Calculated) | ~20 nm (TEM) |
| $BN_{NS}$-FLG | 10:1, 50:1 | $BN_{NS}$, 16 nm | FLG, 7 mm | 50, 250 nm (Calculated) | ~5 nm (TEM) |

FIG. 1 shows a metamaterial structure and a method of forming the metamaterial structure according to an embodiment of the present invention.

Referring to FIG. 1, a carbon unit structure suspension is formed using graphite, and a boron nitride unit structure suspension is formed using hexagonal boron nitride (h-BN).

The EG unit structures and the FLG unit structures react with polyethyleneimine (PEI), an ionic surfactant, to form a black unit structure suspension, and the $BN_{NF}$ unit structures and the $BN_{NS}$ unit structures react with sodium dodecylbenzenesulfonate (SDBS), an ionic surfactant to form a white unit structure suspension. For example, an EG suspension containing EG nanoflakes (thickness of about 18 nm) is formed using graphite powder, and an FLG suspension containing FLG nanosheets (thickness of about 7 nm) is formed using FLG powder. A $BN_{NF}$ suspension containing h-BN nanoflakes ($BN_{NF}$) (thickness of about 80 nm) and a $BN_{NS}$ suspension containing h-BN nanosheets ($BN_{NS}$) (thickness of about 16 nm) are formed using the hexagonal boron nitride unit structures. the h-BN nanoflakes ($BN_{NF}$), the h-BN nanosheets ($BN_{NS}$), the EG nanoflakes, and the FLG nanosheets serve as unit structures constituting bulk hyperbolic metamaterials. Their thickness and mixing ratio are means of controlling the structure and composition of the metamaterial structures as final bulk materials, and thus can be a tuning tool for the hyperbolic properties of the metamaterial structures.

Hexagonal boron nitride (h-BN) and graphite in bulk form have similar hexagonal single-atom-thick layered structure with very close unit cell dimension weakly bound by van der Waals interactions, can be easily broken into nanolayers, and can reform the heterostructures with coherent interfaces between them by proper processes. Hexagonal boron nitride (h-BN) is well known to exhibit hyperbolicity in the mid- to long infrared spectral ranges, thereby useful for the various thermal engineering applications to accomplish controlled, directional, and polarized emissions. Graphite and its thin structural derivatives can serve to modulate hyperbolicity of metamaterials by controlling their fermi level via, for example, doping and surface plasmon-phonon polariton coupling.

A heterostructured EG-$BN_{NF}$ nanohybrid structure is formed by mixing the $BN_{NF}$ suspension and the EG suspension, and a heterostructured FLG-$BN_{NS}$ nanohybrid structure is formed by mixing the $BN_{NS}$ suspension and the FLG suspension. Since boron nitride nanoflakes ($BN_{NF}$) and EG nanoflakes have opposite charges, their mixing promotes spontaneous self-assembly reactions induced by electrostatic interactions, resulting in the formation of EG-$BN_{NF}$ nanohybrid structures. Similarly, since boron nitride nanosheets ($BN_{NS}$) and FLG nanosheets have opposite charges, their mixing promotes spontaneous self-assembly reactions induced by electrostatic interactions, resulting in the formation of FLG-$BN_{NS}$ nanohybrid structures.

The EG-$BN_{NF}$ nanohybrid structure is separated and dried, and the powder of the dried EG-$BN_{NF}$ nanohybrid structure is compressed and sintered using SPS to form an EG-$BN_{NF}$ metamaterial structure. The FLG-$BN_{NS}$ nanohybrid structure is separated and dried, and the powder of the dried FLG-$BN_{NS}$ nanohybrid structure is compressed and sintered using SPS to form a FLG-$BN_{NS}$ metamaterial structure.

The EG-$BN_{NF}$ nanohybrid structure and the EG-$BN_{NF}$ metamaterial structure include alternately arranged EG unit structures and $BN_{NF}$ unit structures, and the FLG-$BN_{NS}$ nanohybrid structure and the FLG-$BN_{NS}$ metamaterial structure include alternately arranged FLG unit structures and $BN_{NS}$ unit structures.

Figure 2:
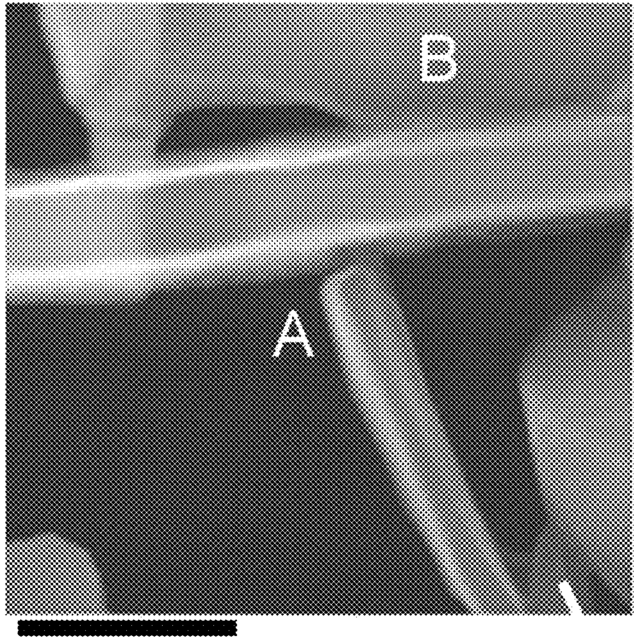
FIG. 2 shows a transmission electron microscope (TEM) image of a nanohybrid structure according to an embodiment of the present invention.
Figure 3:
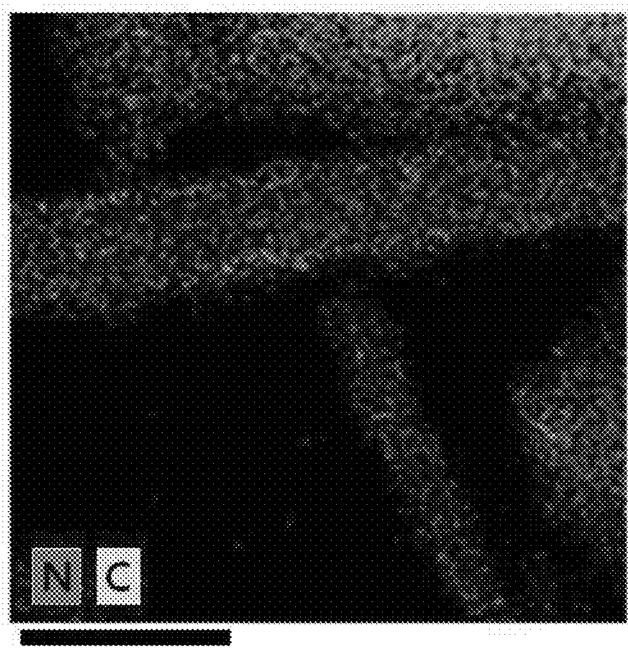
FIG. 3 shows an elemental map of the nanohybrid structure of FIG. 2.

FIG. 2 shows a transmission electron microscope (TEM) image of a nanohybrid structure according to an embodiment of the present invention, and FIG. 3 shows an elemental map of the nanohybrid structure of FIG. 2.

Referring to FIGS. 2 and 3, the formation of the heterostructured nanohybrid structure is confirmed using a spherical aberration-corrected transmission electron microscope. A typical dark-field transmission electron microscope image of the cross-section of the nanohybrid structure clearly shows that the thicker and darker layer is sandwiched between the thinner and lighter layers in the area A. In an elemental map scanned in the same area using transmission electron microscopy (TEM)-energy dispersive spectroscopy (EDS), a layer composed of boron and nitrogen atoms and a layer composed of carbon are clearly identified. The TEM-EDS signal taken in area B indicates that the surface is layered by the carbon atoms.

Figure 4:
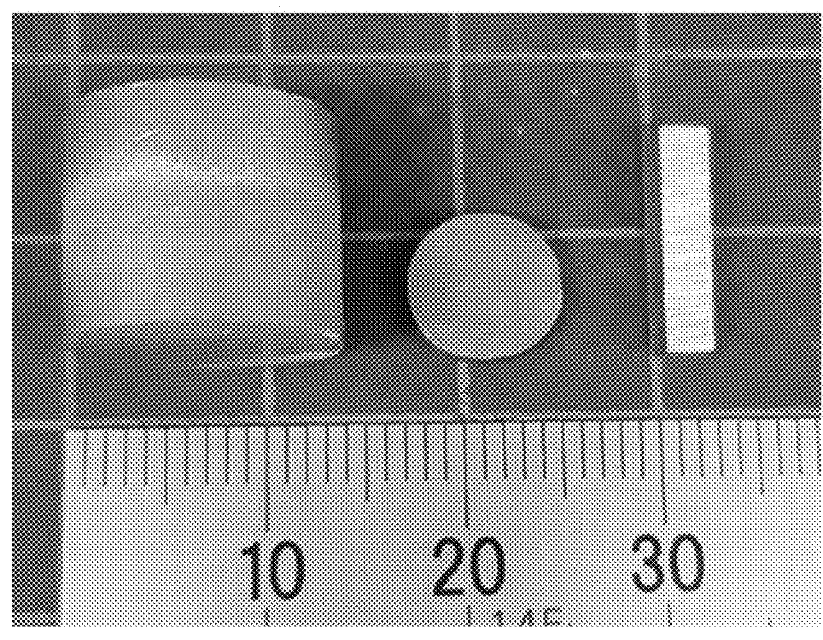
FIG. 4 shows a metamaterial structure including EG-$BN_{NF}$ unit structures.
Figure 5:
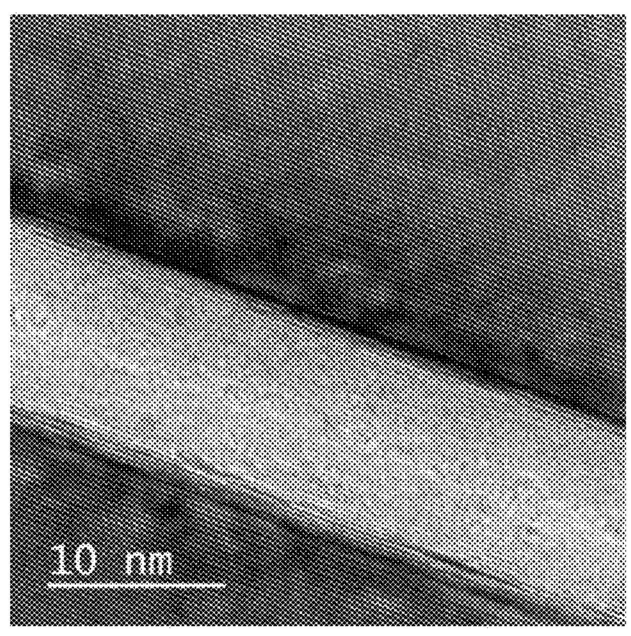
FIG. 5 shows a transmission electron microscope image of a cross section focused on the EG unit structures in the metamaterial structure of FIG. 4.

FIG. 4 shows a metamaterial structure including EG-$BN_{NF}$ unit structures, and FIG. 5 shows a transmission electron microscope image of a cross section focused on the EG unit structures in the metamaterial structure of FIG. 4.

Referring to FIGS. 4 and 5, the EG-$BN_{NF}$ nanohybrid structure is transformed into the EG-$BN_{NF}$ metamaterial structure using spark plasma sintering (SPS) under high pressure and high temperature. The size of the metamaterial structure can be easily controlled using molds of various sizes. In addition, the metamaterial structure can be cut and polished into a desired shape.

A representative cross-sectional spherical aberration-corrected transmission electron microscope image focused on the EG unit structure clearly shows that the EG and $BN_{NF}$ unit structures are formed parallel along the in-plane direction according to the high pressure compression process by SPS.

Although not shown in the figure, the elemental maps obtained by scanning the cross section of the metamaterial structure made of the EG-$BN_{NF}$ unit structures and the FLG-$BN_{NS}$ unit structures by TEM-EDS show that the carbon unit structures with a respective thickness of about 20 nm and about 5 nm are monodispersed in the boron nitride matrix. The thickness of the EG and FLG unit structures in the metamaterial structure by transmission electron microscopic observation can be compared to the thickness of the starting materials in the suspensions, confirming that they are not re-agglomerated during the self-assembly reaction. That is, the single units of the EG/FLG unit structures are statistically distributed in the BN matrix, and the separation between the carbon areas is determined by the mixing ratio of the EG/FLG and $BN_{NF}$/$BN_{NS}$ unit structures. The average thickness of the h-BN layer in the metamaterial structure increases as the mixing ratio of the h-BN suspension increases during the self-assembly reaction for the nanohybrid structure. The mass ratio of BN to carbon (FLG or EG) in the metamaterial structure is between 10:1 and 80:1, and it is confirmed that the metamaterial structure is stable in this range.

Figure 6:
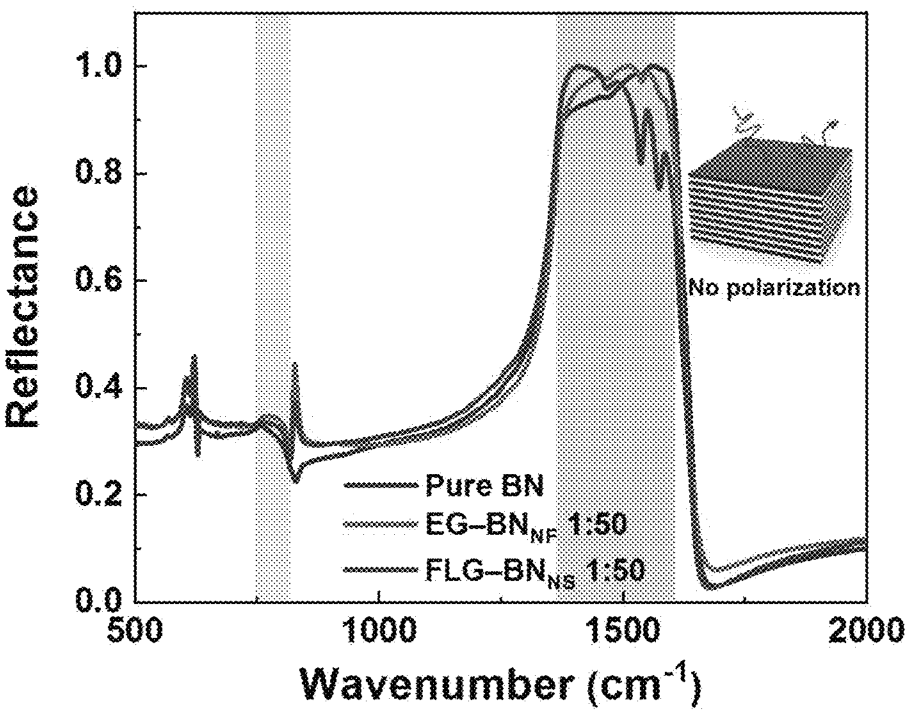
FIG. 6 shows an experimental unpolarized diffuse reflectance spectra taken parallel to the press direction of spark plasma sintering (SPS) for a metamaterial structure including the EG-$BN_{NF}$ unit structures or the FLG-$BN_{NS}$ unit structures with a mass ratio of C:BN=1:50.
Figure 7:
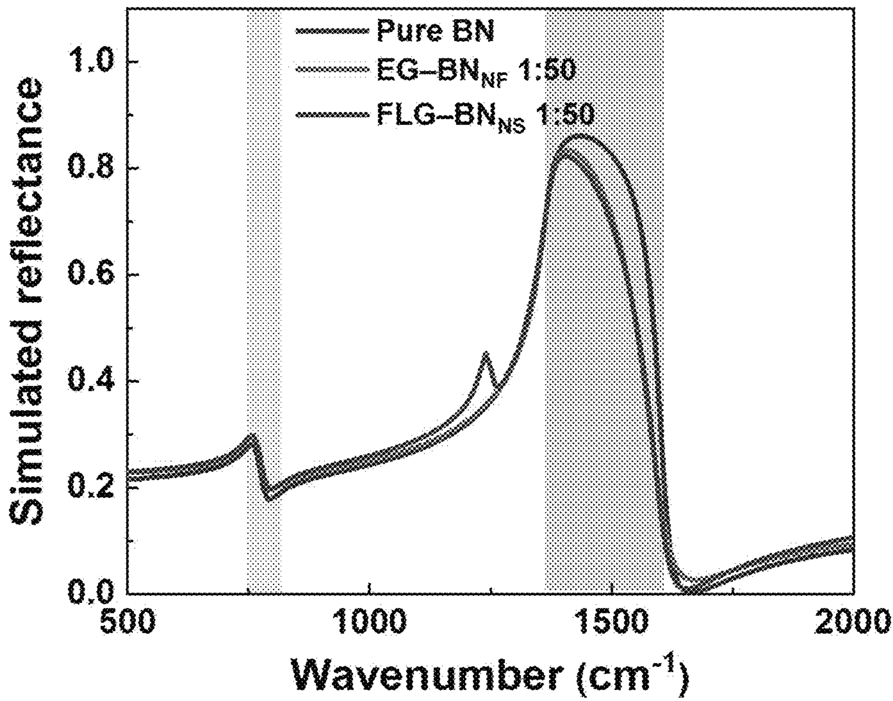
FIG. 7 shows a theoretically calculated spectrum for the metamaterial structure of FIG. 6.

FIG. 6 shows an experimental unpolarized diffuse reflectance spectra taken parallel to the press direction of spark plasma sintering (SPS) for a metamaterial structure including the EG-$BN_{NF}$ unit structures or the FLG-$BN_{NS}$ unit structures with a mass ratio of C:BN=1:50, and FIG. 7 shows a theoretically calculated spectrum for the metamaterial structure of FIG. 6.

Referring to FIGS. 6 and 7, h-BN shows opposite characteristics of permittivity tensors (ε) at the two spectral regions. The type-I region exhibits $\vartheta^{\parallel}>0$ and $\varepsilon^{\perp}<0$ in the frequency range of 746-819 $cm^{-1}$, and the type-II region exhibits $\varepsilon^{\parallel}<0$ and $\varepsilon^{\perp}>0$ in the frequency range of 1370-1610 $cm^{-1}$. The metamaterial structure exhibits the significant modulation in the position and intensity both for the type-I and II hyperbolic responses by changing the combination of the unit structures. The EG-$BN_{NF}$ metamaterial structure shows that the type-II resonance modes redshift in comparison with the pure bulk h-BN. The FLG-$BN_{NS}$ metamaterial structure, the heterostructure of the thinner unit structure pair, exhibits the greater shift in the type-I and II hyperbolic responses. The type-II resonance spectra also display the reduced band width with the same trend as the redshift in frequency. That is, the insertion of the EG/FLG into the h-BN bulk matrix shifts the type-I and II responses to the lower energy region and decreases the bandwidth of the latter. The degree of the modulation increases with the decreasing thickness of the h-BN layer ($d_{h\text{-}BN}$). These experimental observations are consistent with the theoretical calculations.

Figure 8:
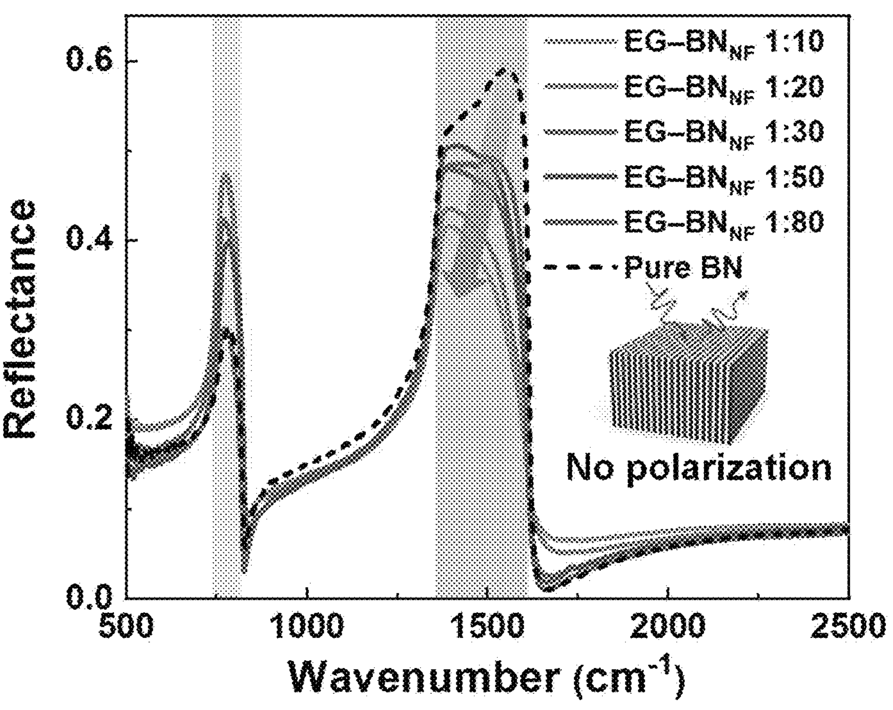
FIG. 8 shows an experimental unpolarized diffuse reflectance spectra taken perpendicular to the press direction of spark plasma sintering (SPS) for a EG-$BN_{NF}$ metamaterial structure including the EG-$BN_{NF}$ unit structures with a various mass ratio (1:10 to 1:80) of C:BN.
Figure 9:
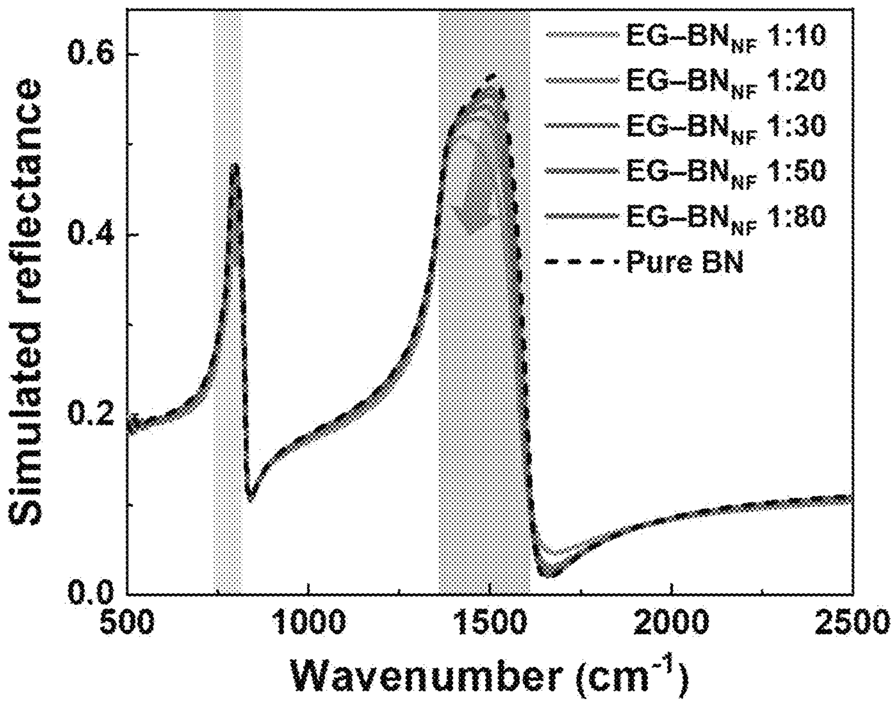
FIG. 9 shows a theoretically calculated spectrum for the EG-$BN_{NF}$ metamaterial structure of FIG. 8.

FIG. 8 shows an experimental unpolarized diffuse reflectance spectra taken perpendicular to the press direction of spark plasma sintering (SPS) for a EG-$BN_{NF}$ metamaterial structure including the EG-$BN_{NF}$ unit structures with a various mass ratio (1:10 to 1:80) of C:BN, and FIG. 9 shows a theoretically calculated spectrum for the EG-$BN_{NF}$ metamaterial structure of FIG. 8.

Referring to FIGS. 8 and 9, as the concentration of the $BN_{NF}$ unit structure in the EG-$BN_{NF}$ metamaterial structure decreases and accordingly the mean $d_{h\text{-}BN}$ reduces, the intensity of the type-I resonance mode increases while that of the type-II declines. The introduction of the EG unit structure to the h-BN matrix diminishes the mean (effective) thickness of the h-BN layer from 1,600 nm to 200 nm. The bandwidth of the type-II signal also decreases progressively. These experimental observations are consistent with the theoretical calculations.

Figure 10:
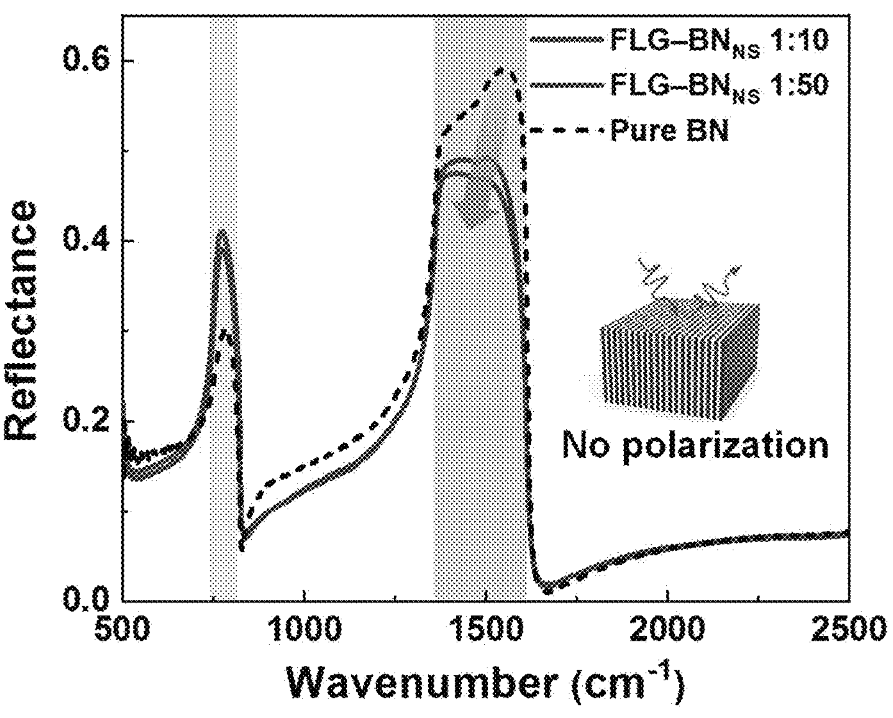
FIG. 10 shows an experimental unpolarized diffuse reflectance spectra taken perpendicular to the press direction of spark plasma sintering (SPS) for a FLG-$BN_{NS}$ metamaterial structure including the FLG-$BN_{NS}$ unit structures with a various mass ratio (1:10, 1:50) of C:BN.
Figure 11:
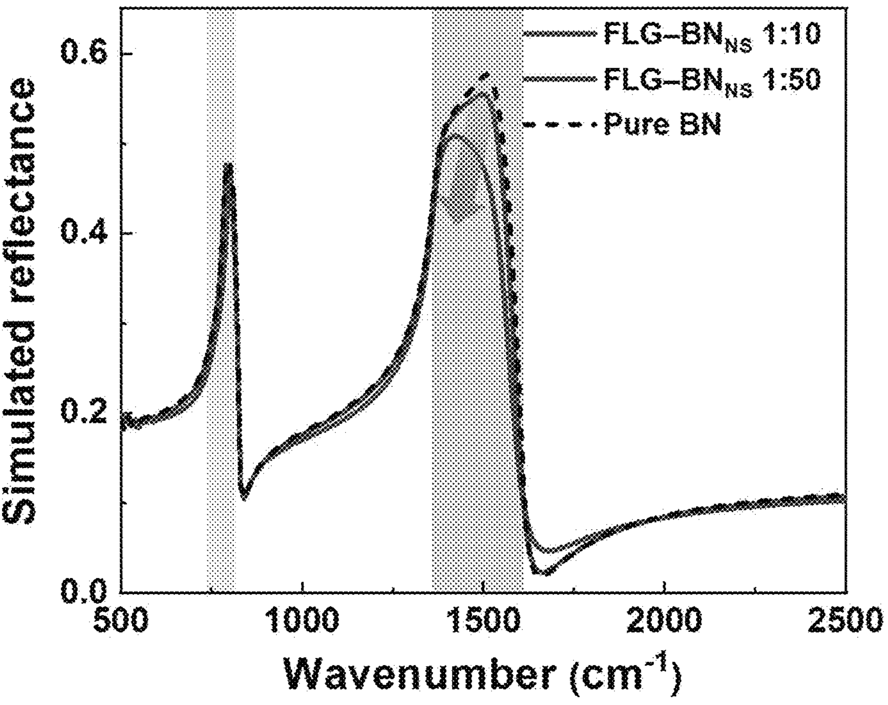
FIG. 11 shows a theoretically calculated spectrum for the FLG-$BN_{NS}$ metamaterial structure of FIG. 10.

FIG. 10 shows an experimental unpolarized diffuse reflectance spectra taken perpendicular to the press direction of spark plasma sintering (SPS) for a FLG-$BN_{NS}$ metamaterial structure including the FLG-$BN_{NS}$ unit structures with a various mass ratio (1:10, 1:50) of C:BN, and FIG. 11 shows a theoretically calculated spectrum for the FLG-$BN_{NS}$ metamaterial structure of FIG. 10.

Referring to FIGS. 10 and 11, the FLG-$BN_{NS}$ metamaterial structure shows the same modulation trends as the EG-$BN_{NF}$ metamaterial structure in the hyperbolic responses. These experimental observations are consistent with the theoretical calculations. This indicates that hyperbolic resonance tuning for the metamaterial structures is possible.

Figure 12:
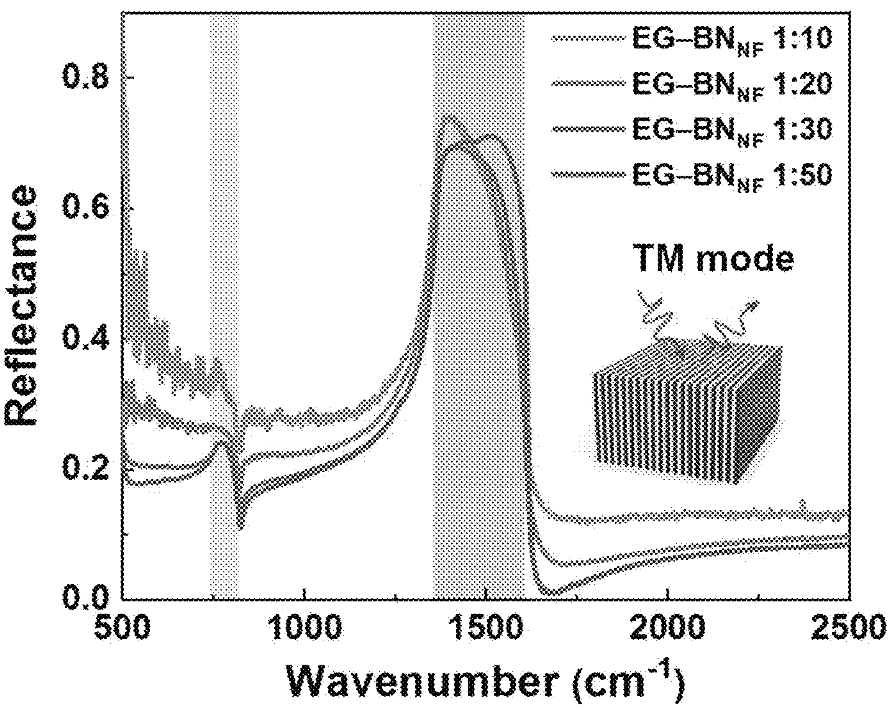
FIG. 12 shows an experimental polarized transverse magnetic (TM) reflectance spectra taken perpendicular to the press direction of spark plasma sintering (out-of-plane direction) for a EG-$BN_{NF}$ metamaterial structure including the EG-$BN_{NF}$ unit structures with a various mass ratio (1:10 to 1:50) of C:BN.
Figure 13:
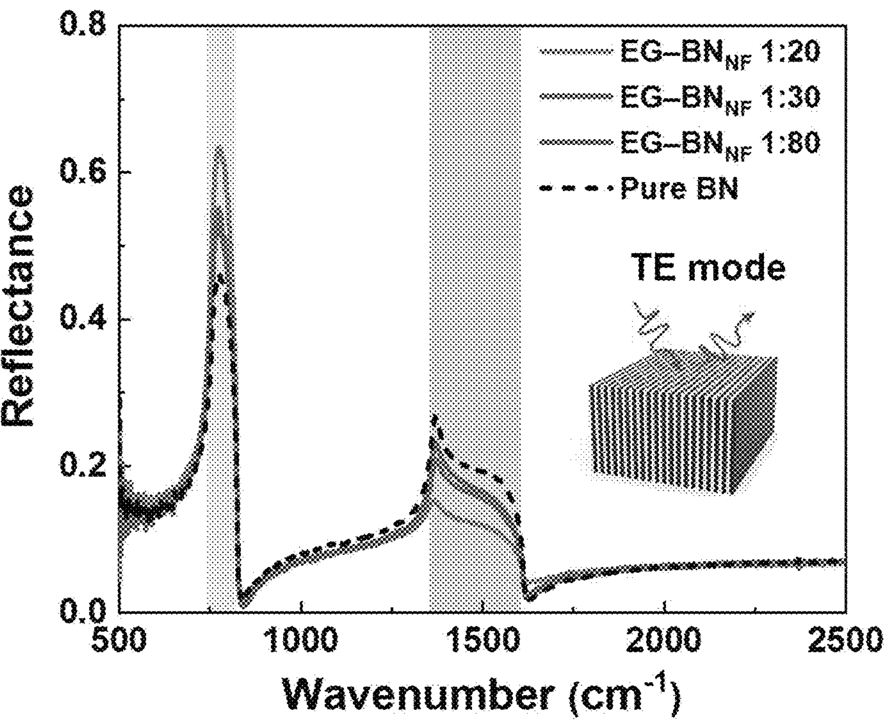
FIG. 13 shows an experimental polarized transverse electronic (TE) reflectance spectra taken perpendicular to the press direction of spark plasma sintering (out-of-plane direction) for a EG-$BN_{NF}$ metamaterial structure including the EG-$BN_{NF}$ unit structures with a various mass ratio (1:20 to 1:80) of C:BN.

FIG. 12 shows an experimental polarized transverse magnetic (TM) reflectance spectra taken perpendicular to the press direction of spark plasma sintering (out-of-plane direction) for a EG-$BN_{NF}$ metamaterial structure including the EG-$BN_{NF}$ unit structures with a various mass ratio (1:10 to 1:50) of C:BN, and FIG. 13 shows an experimental polarized transverse electronic (TE) reflectance spectra taken perpendicular to the press direction of spark plasma sintering (out-of-plane direction) for a EG-$BN_{NF}$ metamaterial structure including the EG-$BN_{NF}$ unit structures with a various mass ratio (1:20 to 1:80) of C:BN.

Referring to FIGS. 12 and 13, the transverse magnetic (TM) reflectance spectra exhibit the similar modulation in the type-II hyperbolic resonance mode to the corresponding observation with unpolarized beams. In contrast, the type-I resonance mode changes negligibly with the compositional change in the bulk materials, and its intensity is much weaker than that obtained by unpolarized beams. The transverse electronic (TE) reflectance spectra provide even greater deviation from the results with unpolarized beams. The intensity of the type-I hyperbolic responses substantially increases and is greater than that of the type-II ones. It rises with the increasing EG concentration. The intensity of the type-II signals diminishes with the higher EG content.

Figure 14:
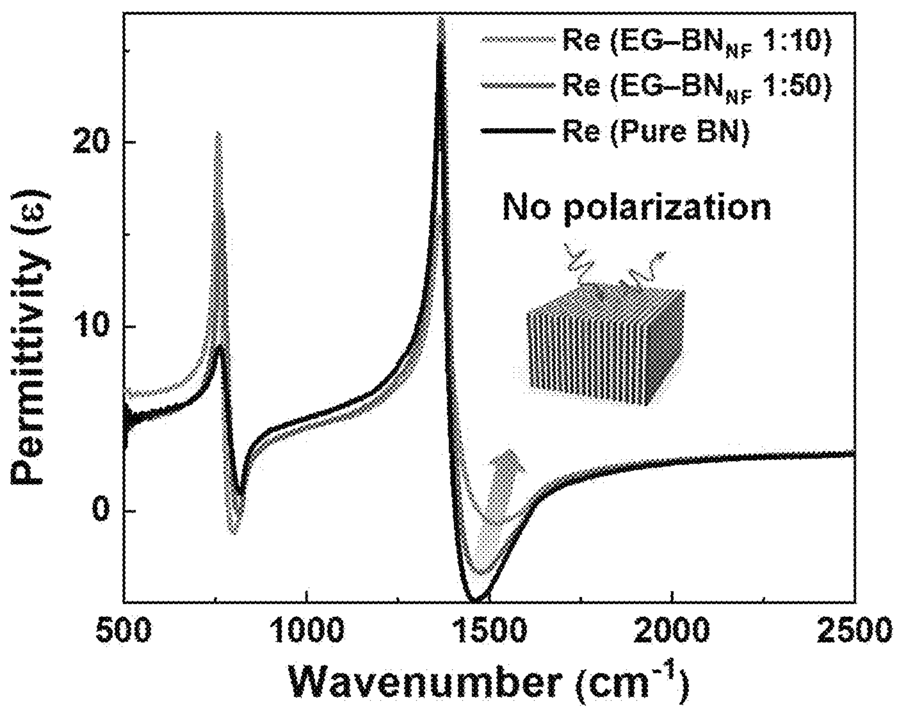
FIGS. 14 and 15 show the real part (Re) and the imaginary part (Im) of the permittivity of the EG-$BN_{NF}$ metamaterial structure with a compositional variance as a function of wavenumber.
Figure 15:
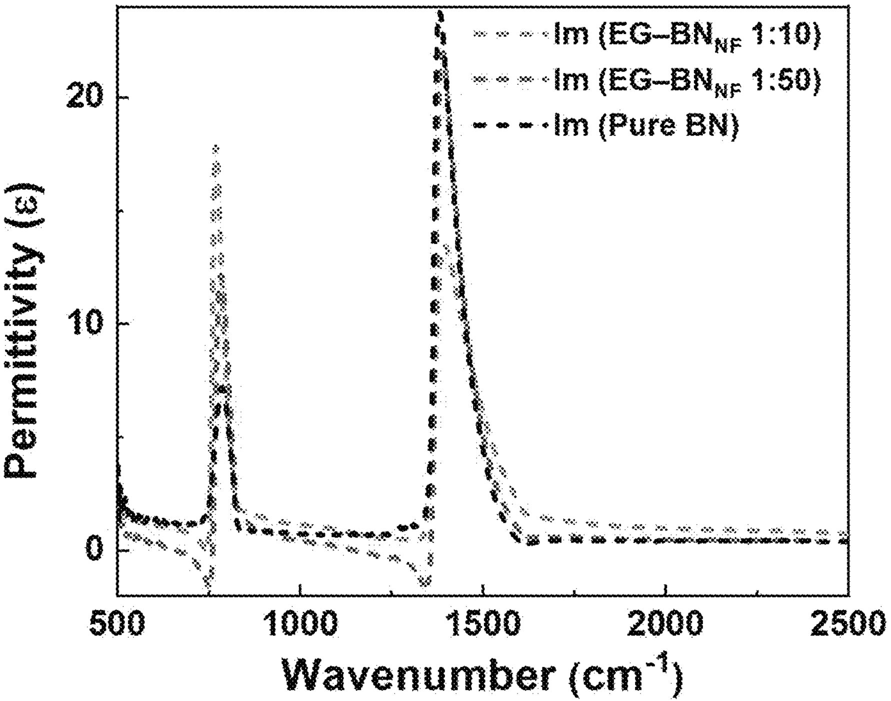
Figure 16:
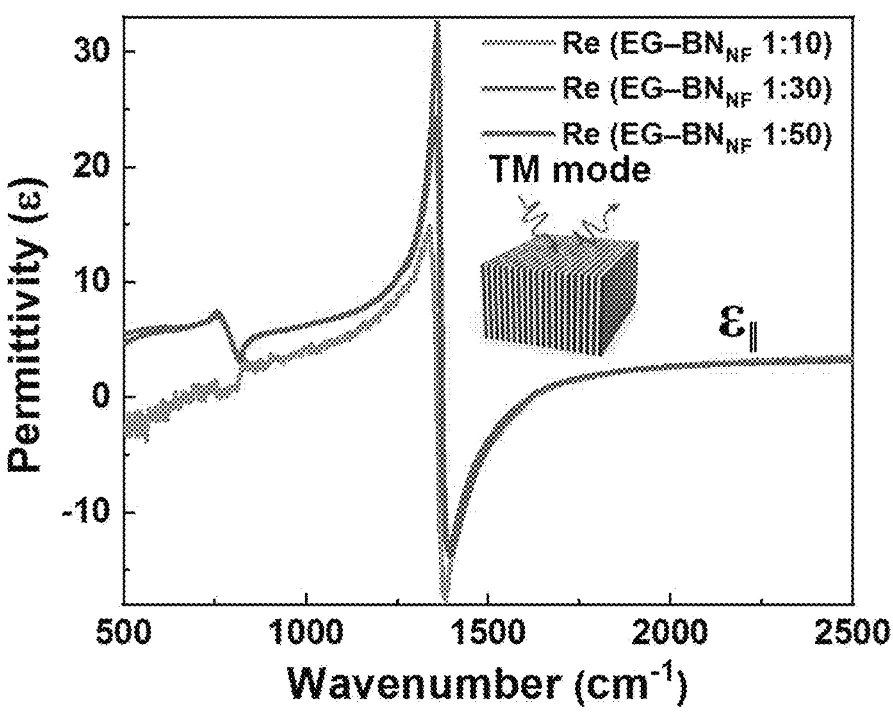
FIGS. 16 and 17 show the real part (Re) and the imaginary part (Im) of the parallel permittivity of the EG-$BN_{NF}$ metamaterial structure with a compositional variance as a function of wavenumber.
Figure 17:
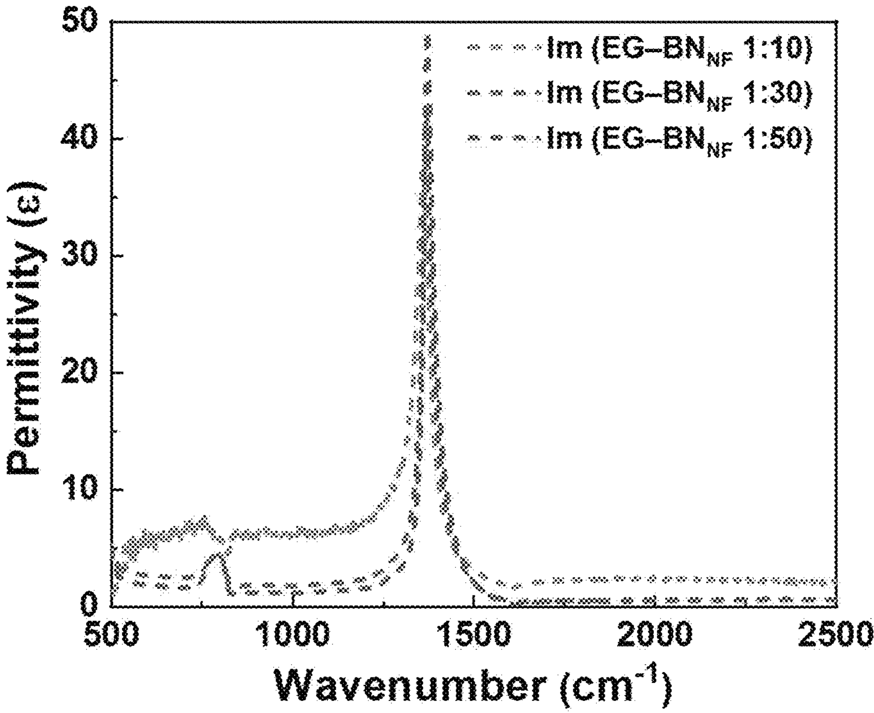
Figure 18:
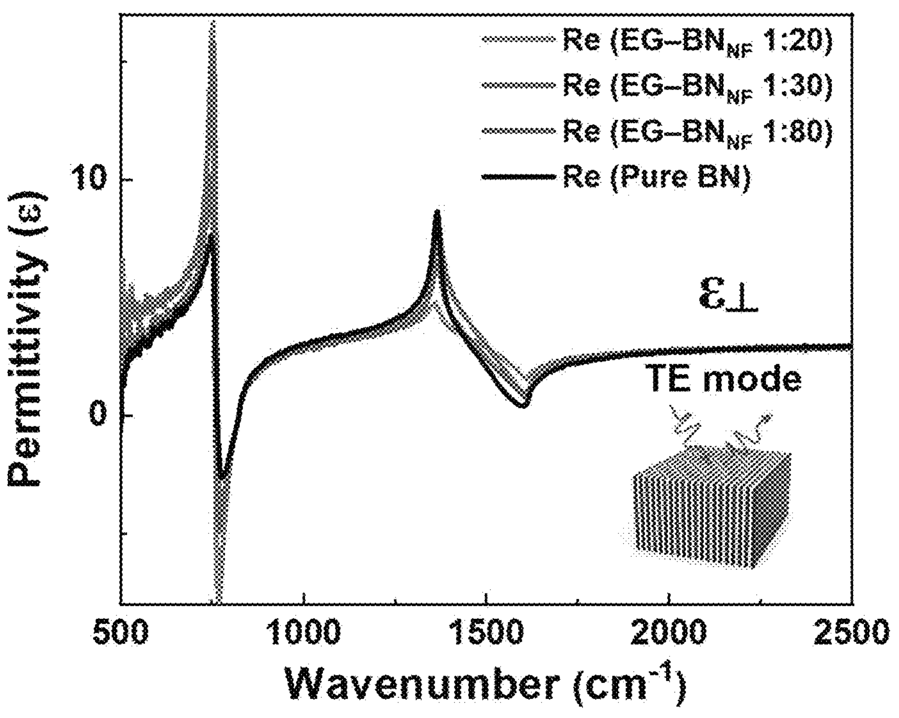
FIGS. 18 and 19 show the real part (Re) and the imaginary part (Im) of the perpendicular permittivity of the EG-$BN_{NF}$ metamaterial structure with a compositional variance as a function of wavenumber.
Figure 19:
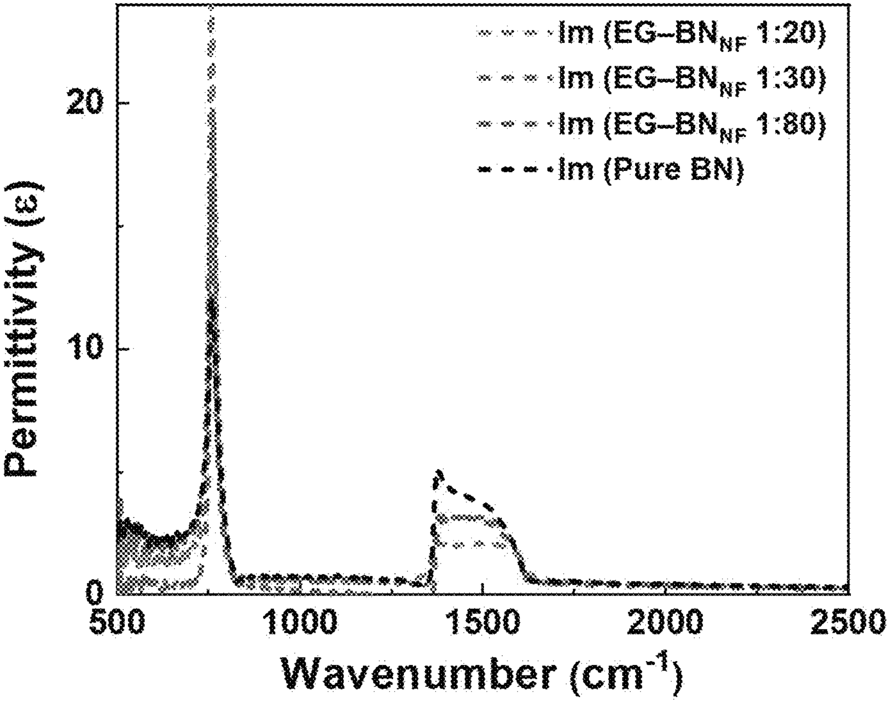

FIGS. 14 and 15 show the real part (Re) and the imaginary part (Im) of the permittivity of the EG-$BN_{NF}$ metamaterial structure with a compositional variance as a function of wavenumber. FIGS. 16 and 17 show the real part (Re) and the imaginary part (Im) of the parallel permittivity of the EG-$BN_{NF}$ metamaterial structure with a compositional variance as a function of wavenumber. FIGS. 18 and 19 show the real part (Re) and the imaginary part (Im) of the perpendicular permittivity of the EG-$BN_{NF}$ metamaterial structure with a compositional variance as a function of wavenumber.

Referring to FIGS. 14 and 19, the permittivity exhibits a significant systematic variation according to compositional changes from both the unpolarized and polarized beam. Coupling the EG with the different concentration of the $BN_{NF}$ unit structure delicately tunes the hyperbolic frequency showing the negative real in-plane permittivity ($\varepsilon_{\|}$) from the polarized TM beam. The out-of-plane permittivity ($\varepsilon_{\perp}$) exhibits the enhanced hyperbolic signal as the concentration of EG increases from the polarized TE beam. These results demonstrate that the hyperbolic properties of the metamaterial structure are finely tunable via controlling the unit structures and chemical compositions, enabling commercial applications of mass-producible metamaterials. The optical loss of the hyperbolic metamaterials can be further suppressed when a monoisotopic starting reagent such as h-$^{11}$BN or h-$^{10}$BN are used.

As above, the exemplary embodiments of the present invention have been described. Those skilled in the art will appreciate that the present invention may be embodied in other specific ways without changing the technical spirit or essential features thereof. Therefore, the embodiments disclosed herein are not restrictive but are illustrative. The scope of the present invention is given by the claims, rather than the specification, and also contains all modifications within the meaning and range equivalent to the claims.

What is claimed is:

1. A metamaterial structure comprising:

first metamaterial unit structures and second metamaterial unit structures, wherein the first metamaterial comprises hexagonal boron nitride, and the second metamaterial comprises graphite, wherein the first metamaterial unit structures comprise boron nitride nanoflakes, or boron nitride nanosheets, or both, and the second metamaterial unit structures comprise exfoliated graphite nanoflakes, or few-layer graphene nanosheets, or both, and wherein the second metamaterial unit structures are dispersed in a boron nitride matrix including the first metamaterial unit structures.

2. The metamaterial structure of claim 1, wherein the properties of the metamaterial structure are controlled by the thickness and mixing ratio of the first metamaterial unit structures and the second metamaterial unit structures.

3. The metamaterial structure of claim 1, wherein the metamaterial structure is formed by a method comprising:

forming a first suspension including the first metamaterial unit structures formed by exfoliation of a first metamaterial by mixing the first metamaterial and a first solvent, forming a second suspension including the second metamaterial unit structures formed by exfoliation of a second metamaterial by mixing the second metamaterial and a second solvent, forming a nanohybrid structure in which the first metamaterial unit structures and the second metamaterial unit structures are arranged alternately by mixing the first suspension and the second suspension, and compressing and sintering the nanohybrid structure.

4. The metamaterial structure of claim 3, wherein the first metamaterial unit structures and the second metamaterial unit structures have opposite charges to each other, and wherein the nanohybrid structure is formed by a spontaneous self-assembly reaction induced by the electrostatic interaction between the first metamaterial unit structures and the second metamaterial unit structures.

5. The metamaterial structure of claim 1, wherein the second metamaterial unit structures are statistically distributed in the boron nitride matrix.

* * * * *